(12) United States Patent
Hwang

(10) Patent No.: US 7,452,232 B2
(45) Date of Patent: Nov. 18, 2008

(54) HARD DISK DRIVE WITH SUPPLEMENTAL MECHANICAL COUPLING MECHANISM

(75) Inventor: Ji-Ho Hwang, Yeosu-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/600,112

(22) Filed: Nov. 16, 2006

(65) Prior Publication Data
US 2007/0149029 A1 Jun. 28, 2007

(30) Foreign Application Priority Data
Dec. 28, 2005 (KR) .................... 10-2005-0131538

(51) Int. Cl.
*H01R 13/627* (2006.01)
(52) U.S. Cl. ...................................... 439/351
(58) Field of Classification Search ................ 439/350, 439/351, 352, 353, 354, 355, 356, 357, 607, 439/609, 610
See application file for complete search history.

(56) References Cited

U.S. PATENT DOCUMENTS

| | | | | |
|---|---|---|---|---|
| 3,901,575 A | * | 8/1975 | Hoover | 439/342 |
| 4,986,763 A | * | 1/1991 | Boyle | 439/165 |
| 5,030,128 A | * | 7/1991 | Herron et al. | 439/372 |
| 5,080,603 A | * | 1/1992 | Mouissie | 439/353 |
| 6,139,350 A | * | 10/2000 | Mathesius | 439/357 |
| 6,485,315 B1 | * | 11/2002 | Hwang | 439/108 |
| 6,648,695 B1 | | 11/2003 | Wu | |
| 6,663,434 B1 | | 12/2003 | Wu | |
| 6,699,066 B2 | * | 3/2004 | Wu | 439/495 |
| 6,712,632 B2 | | 3/2004 | Wu | |
| 6,764,344 B2 | * | 7/2004 | Maiers | 439/629 |
| 2004/0132329 A1 | * | 7/2004 | Shimoyama et al. | 439/352 |
| 2006/0052001 A1 | * | 3/2006 | Parker | 439/358 |

\* cited by examiner

*Primary Examiner*—Chandrika Prasad
(74) *Attorney, Agent, or Firm*—Volentine & Whitt, PLLC

(57) ABSTRACT

A hard disk drive (HDD) adapted for connection to a receptacle of a host device is disclosed. The HDD comprises a base having a lower portion coupled to a printed circuit board assembly (PCBA), the PCBA comprising a plug adapted for coupling to the receptacle, and a dummy coupling portion provided on the receptacle and the base to provide supplemental mechanical coupling strength between the receptacle and the plug.

20 Claims, 11 Drawing Sheets

HARD DISK DRIVE WITH SUPPLEMENTAL MECHANICAL COUPLING MECHANISM

BACKGROUND OF THE INVENTION

1. Field of the Invention

Embodiments of invention relate to a hard disk drive and a computer having the same. More particularly, embodiments of the invention relate to a hard disk drive having a reduced minimum thickness profile, yet simultaneously providing enhanced coupling strength between a receptacle in a computer and a corresponding plug for the hard disk drive This application claims priority under 35 U.S.C. § 119 from Korean Patent Application No. 10-2005-0131538, filed on 28 Dec. 2005, the subject matter of which is hereby incorporated by reference in its entirety.

2. Description of Related Art

Hard disk drives (HDDs) are formed from electrical and mechanical components, and serve as bulk memory storage devices in a variety of consumer products, such as computers. HDDs are able to record a large volume of data by converting digital data signals into a corresponding magnetic field and impressing the magnetic field upon a recording medium. Data is reproduced by reversing the process, i.e., reading the magnetic field and generating corresponding digital data signals. Data is written on the magnetic medium in tracks. The density of the recorded data is expressed in terms of tracks per inch (TPI) and/or bits per inch (BPI). Recent improvements in HDD technology have increased TPI and BPI densities (e.g., achieved higher data storage capacity per unit volume), and thereby opened up new fields of HDD application. Some emerging HDDs have a diameter of 0.85 inches, about the size a coin, and are being identified for use in next generation mobile phones.

Since HDDs can access a large amount of data at high speed, they are widely used as an auxiliary memory device in computers, including notebook computers, PDAs, and desktop computers. When an HDD is used as a peripheral device within a computer, it is usually connected to a main printed circuit board (PCB) on which a CPU and memory are mounted. Connection of the HDD with the main PCB is commonly made using a serial ATA (SATA) interface. Since the SATA interface exhibits a higher transfer rate and greater stability than existing IDE and enhanced IDE (EIDE) interfaces, wide spread adoption of the SATA interface is expected.

FIG. (FIG.) 1 is an exploded perspective view of a conventional HDD showing a HDD plug adapted to connection with a computer receptacle. Referring to FIG. 1, a plug 170 provided on an HDD 120 may be coupled to a receptacle 115 provided on a computer. (The remainder of the computer other than receptacle 115 is omitted from the figure for the sake of clarity). Although it will be described later, plug 170 may be coupled to one side of a printed circuit board assembly (PCBA) 160 integral to HDD 120. Plug 170 is commonly manufactured from a plastic material and fixed to PCBA 160. The particular form of receptacle 115 shown in FIG. 1 is common to notebook computers but other forms are possible. For example, a common receptacle form used in desktop computers has a different shape and will be described later.

In the conventional technology having the structure shown in FIG. 1, however, since an upper area of plug 170 is open and an additional elastic support member is not provided between plug 170 and receptacle 115, the coupling strength between receptacle 115 and plug 170 is weak. Thus, when HDD 120 is coupled into a computer, plug 170 and receptacle 115 may become easily separated by, for example, mechanical vibration or an external impact applied to the computer or HDD 120 during assembly and/or disassembly. The reliability and stability of the resulting consumer product is correspondingly reduced.

FIG. 2 is an exploded perspective view illustrating another conventional HDD plug and corresponding computer receptacle. The approach illustrated in FIG. 2 is intended to address the problem identified above with respect to the connection components illustrated in FIG. 1. Referring to FIG. 2, in a compact HDD 120a, a support protrusion 115a is additionally provided on receptacle 115. A matching recess is formed in relation to support protrusion 115a in the lower surface of a reinforced portion 170a which shields an upper area of plug 170. Consistent with this approach, support protrusion 115a may be additionally coupled within the recess as receptacle 115 is coupled with plug 170. The additional coupling strength between receptacle 115 and plug 170 is thus enhanced over that of the approach illustrated in FIG. 1.

In the conventional approach illustrated in FIG. 2, however, the reinforced portion 170a necessarily requires the formation of the recess in plug 170. This recess space increases the overall volume of plug 170, and is a design impediment to further effort to reduce thickness profile of compact HDD 120a. That is, in order for the recess to function properly, the thickness of the plastic reinforced portion 170a must be increased. This requirement negatively impacts efforts to reduce the minimum thickness of plug 170, and compact HDD 120a.

SUMMARY OF THE INVENTION

In one aspect, embodiments of the invention provide an HDD better adapted to further reductions in profile thickness, yet also providing enhanced coupling strength with a connected host device, such as a computer. As a result, the reliability and stability of a host device, once connected with the HDD, is improved, as the conventional tendency towards separation between a host device receptacle and an HDD plug is markedly reduced. In another aspect, embodiments of the invention provide a host device, such as a computer, having a receptacle consistent with the foregoing.

Thus in one embodiment, the invention provides a hard disk drive (HDD) adapted for connection to a receptacle of a host device. The HDD comprises a base having a lower portion coupled to a printed circuit board assembly (PCBA), the PCBA comprising a plug adapted for coupling to the receptacle, and a dummy coupling portion provided on the receptacle and the base to provide supplemental mechanical coupling strength between the receptacle and the plug.

In a related aspect, the dummy coupling portion elastically supports coupling between the receptacle and the plug. In another aspect, dummy coupling portion comprises at least one latch provided on the receptacle, and a latch accommodation portion provided on the base and adapted to elastically accommodate the at least one latch. In yet another related aspect, the latch protrudes upward from an upper surface of the receptacle and the latch accommodation portion is a groove formed in a lower surface of the base adjacent to the plug. In still another aspect, a reinforced portion is provided between an end portion of the base and the latch accommodation portion.

BRIEF DESCRIPTION OF THE DRAWINGS

Embodiments of the invention will be described with reference to the accompanying drawings of which.

DESCRIPTION OF EMBODIMENTS

Figure 1:
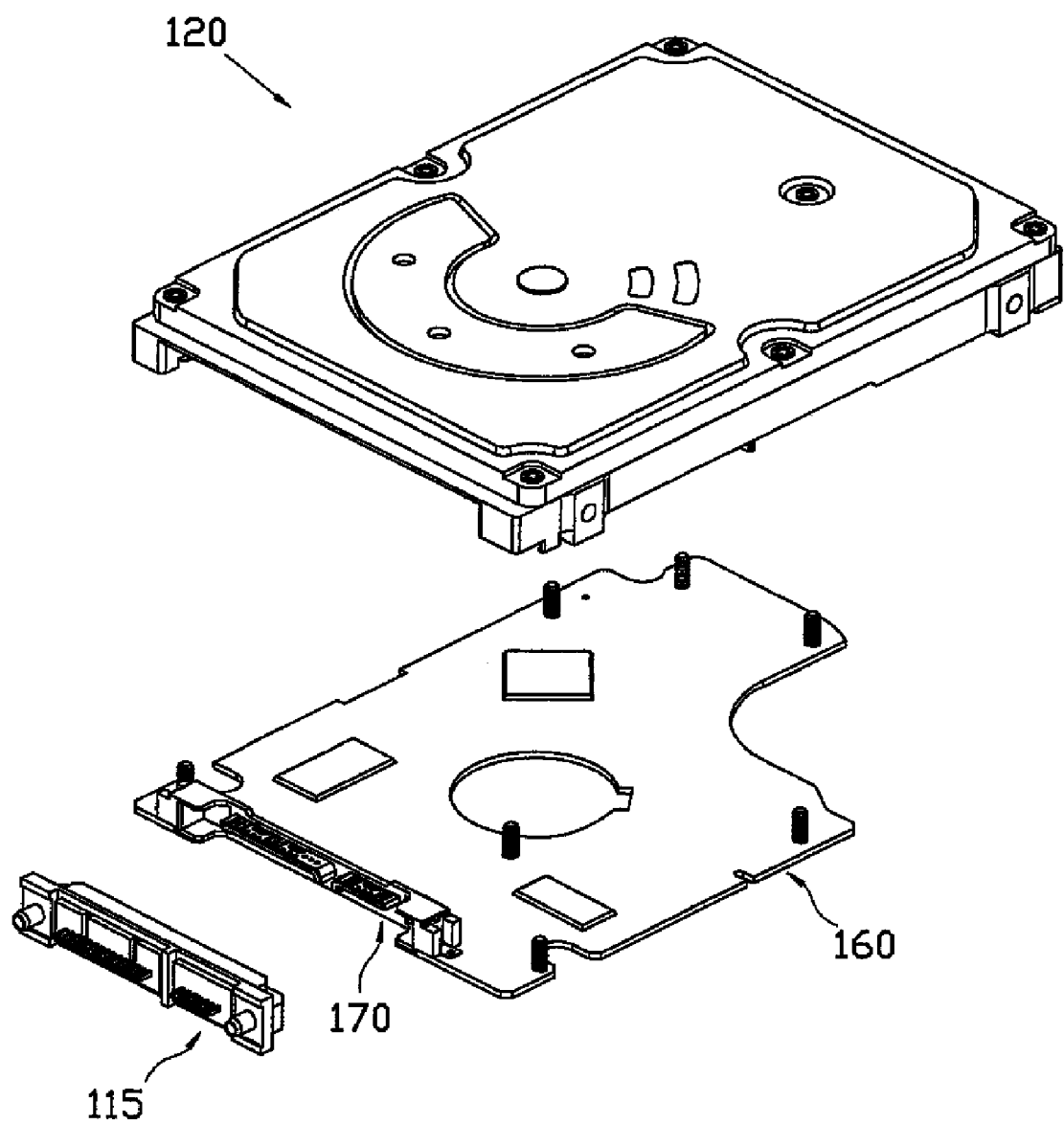
FIG. 1 is an exploded perspective view showing a conventional HDD plug and a corresponding computer receptacle.
Figure 2:
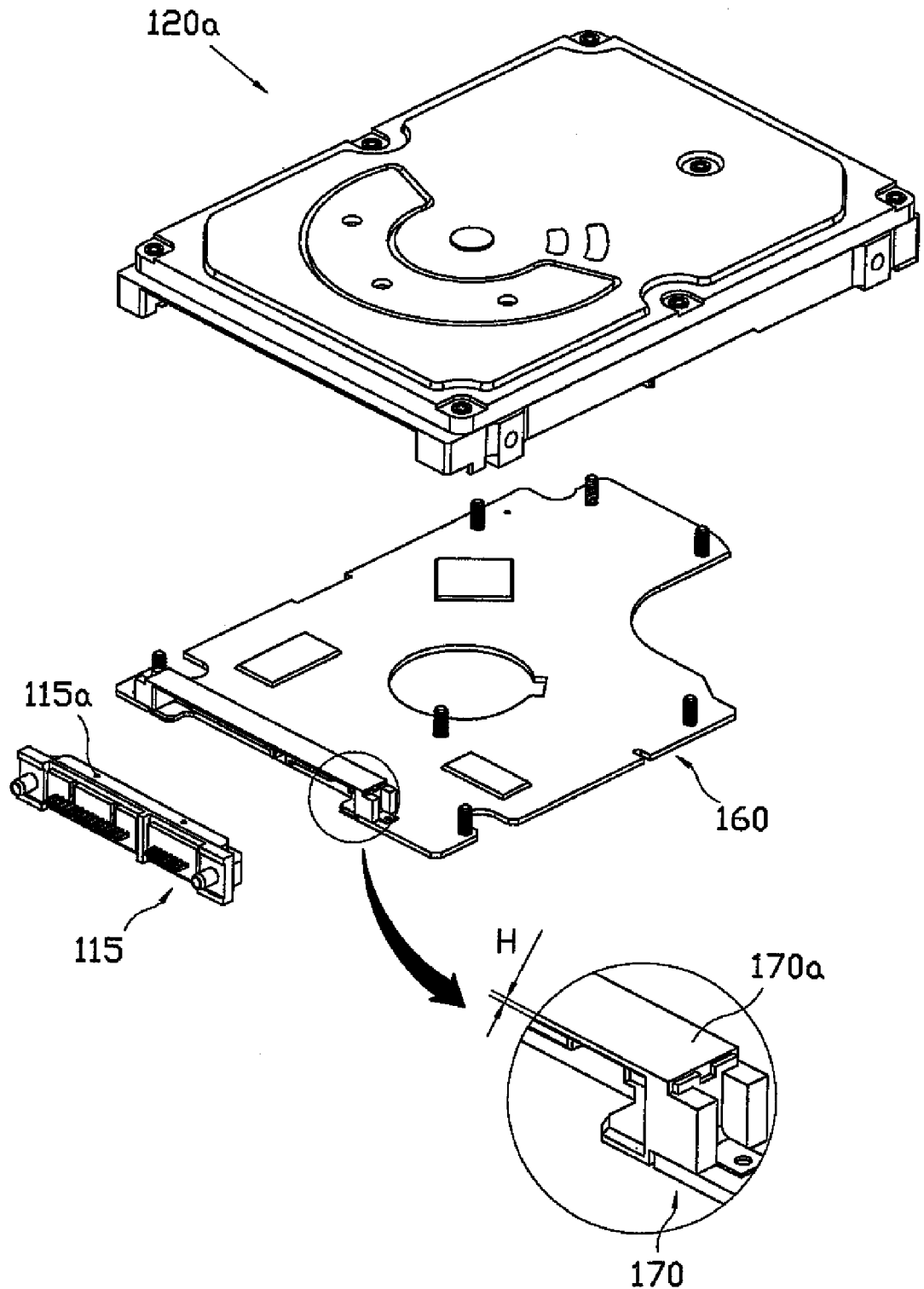
FIG. 2 is an exploded perspective view showing another conventional HDD plug and a corresponding computer receptacle.

Reference will now be made in some additional detail to embodiments of the present invention, examples of which are illustrated in the accompanying drawings, wherein like reference numerals refer to the like elements throughout. The embodiments are described below are presented as teaching examples. The invention may, however, be variously embodied.

Figure 3:
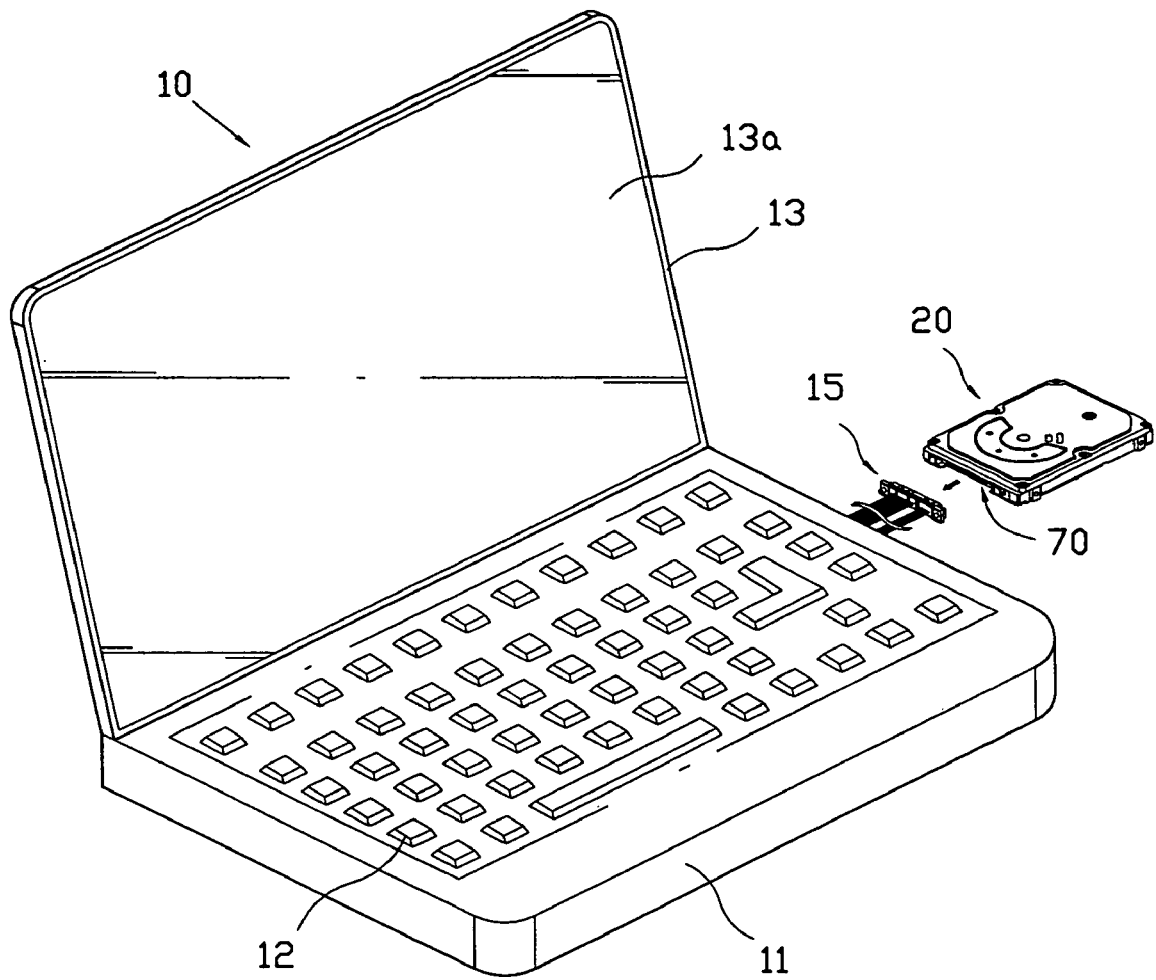
FIG. 3 is a perspective view showing an exemplary HDD according to an embodiment of the invention coupled to a notebook computer.

FIG. 3 is a perspective view showing an HDD according to an embodiment of the invention coupled to a notebook computer. Referring to FIG. 3, a notebook computer 10 includes a main body 11 and a cover 13 that pivots with respect to main body 11. Main body 11 includes a plurality of input buttons 12 and cover 13 includes a display screen 13a. The display screen will typically comprise an LCD display.

Although not shown in FIG. 3, a main PCB having a CPU and memory is installed within main body 11. A receptacle 15 (e.g., see, FIGS. 5 through 8) may be connected to the main PCB (either directly of indirectly) via an additional connector (not shown) provided on the main PCB. As illustrated in FIG. 3, receptacle 15 is externally accessible and located on the exterior of notebook computer 10. However, this is merely for convenience of explanation and in many implementations receptacle 15 may not be externally accessible in the manner illustrated. A plug 70 (e.g., see, FIGS. 5 through 8) is provided on an HDD 20 and is adapted to be coupled with receptacle 15. The illustrated example of FIG. 3 is based on an assumption that a SATA interface is being used. The coupling structure between receptacle 15 and plug 70 will be variously described below in some additional detail.

Figure 4:
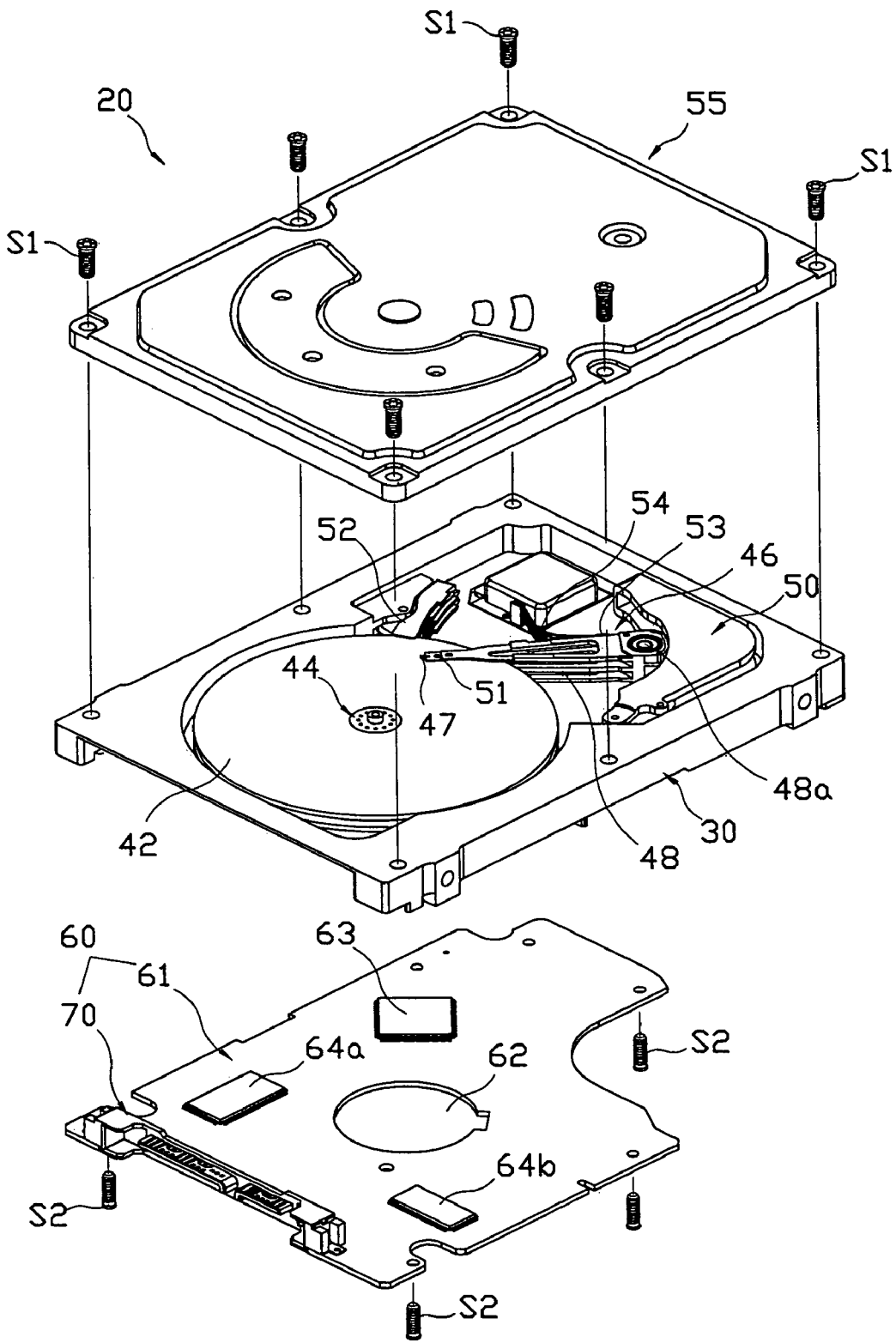
FIG. 4 is an exploded perspective view further illustrating the HDD of FIG. 3.

FIG. 4 is an exploded perspective view of an HDD designed in accordance with an embodiment of the invention. In one aspect, the HDD of FIG. 4 may be used in the manner illustrated in FIG. 3.

Referring to FIG. 4, HDD 20 comprises a base 30, a cover 55 shielding an upper open portion of base 30, and a PCB assembly (PCBA) 60 coupled to the lower portion of base 30.

As will be described in greater detail hereafter, a plurality of internal parts related to the read/write functions of HDD 20 may be installed on base 30. In base 30 of FIG. 4, the internal parts may be accommodated within a recessed inner space of base 30. Such a design type is commonly referred to as a "bowl type," but the invention is readily applicable to other HDD design types.

Base 30 may be manufactured from aluminum or a similar material having a predetermined thickness, but also maintaining a desired stiffness and serving as an electrical ground for various internal components. Indeed, base 30 may be formed by injection molding or a stamped press operation from aluminum stock or a similar material. The internal components of HDD 20 related to the read/write functions and provided on base 30 may include, for example, at least one disk 42 adapted to record and store data, a spindle motor 44 provided at the central area of disk 42 and adapted to rotate disk 42, a head stack assembly (HSA) 46 adapted to move across disk 42, and a ramp 52 provided to one side of disk 42.

HSA 46 may include a magnetic head 47 adapted to record data on disk 42 and/or reproduce recorded data and an actuator 48 adapted to fly magnetic head 47 so that magnetic head 47 may access data from disk 42. Actuator 48 is capable of rotating around a pivot shaft 48a with respect to disk 42. In one embodiment, as a bobbin (not shown) installed at an end of actuator 48 is moved left and right by operation of a voice coil motor VCM 50, magnetic head 47 installed at the other end thereof records or reproduces data with respect to tracks on disk 42.

As magnetic head 47—which is installed at one end of head gimbal 51 extended from and connected to actuator 48—is lifted by an air flow across the surface of disk 42 as disk 42 rotates at high speed, it is able to fly across the surface of disk 42 while maintaining a defined separation gap. Magnetic head 47 is parked on a ramp 52 provided close to disk 42 when the supply of power to HDD 20 is discontinued. This particular approach is commonly referred to as a ramp loading method.

In some HDDs, however, another method of parking magnetic head 47 in a parking zone provided within an inner circumference of disk 42 (where data is not recorded) is used. This approach is commonly referred to as a contact start stop (CSS) method. At a minimum, embodiments of the invention will find application in either type of HDD, i.e., those employing a ramp loading method and those employing a CSS method. In a HDD employing a CSS method, ramp 52 may be excluded from the illustrated example shown in FIG. 4.

A preamplifier 53 adapted to amplify a signal received from magnetic head 47 is provided to one side of HSA 46. Preamplifier 53 is connected to PCBA 60 and provided in a lower portion of base 30 via a flexible printed circuit 54. A cover 55 is attached to base 30 in order to shield the upper surface of base 30. A plurality of bolts or similar mechanical fashioners SI may be used for this purpose. Cover 55 protects the internal components of HDD 20 and also prevents electromagnetic energy generated by the internal components from being transferred to adjacent devices and circuits via radiation or conduction paths.

Figure 5:
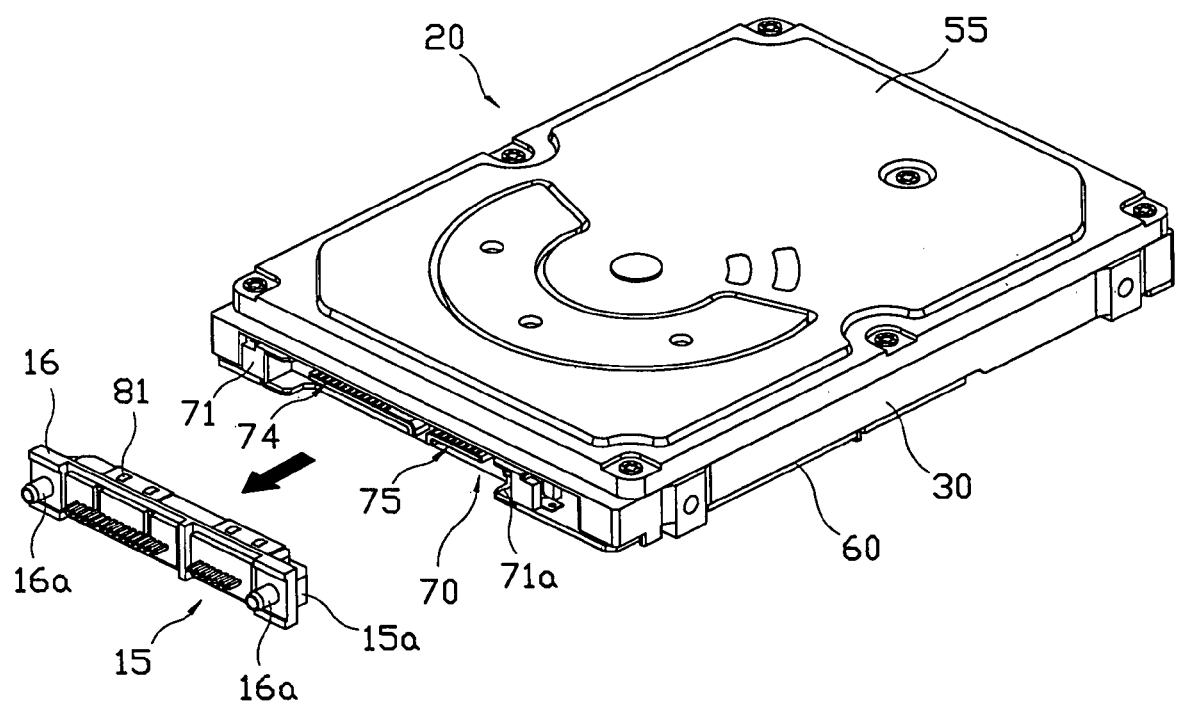
FIG. 5 is a perspective view of a receptacle provided in a notebook computer and a corresponding HDD plug according to an embodiment of the invention.
Figure 6:
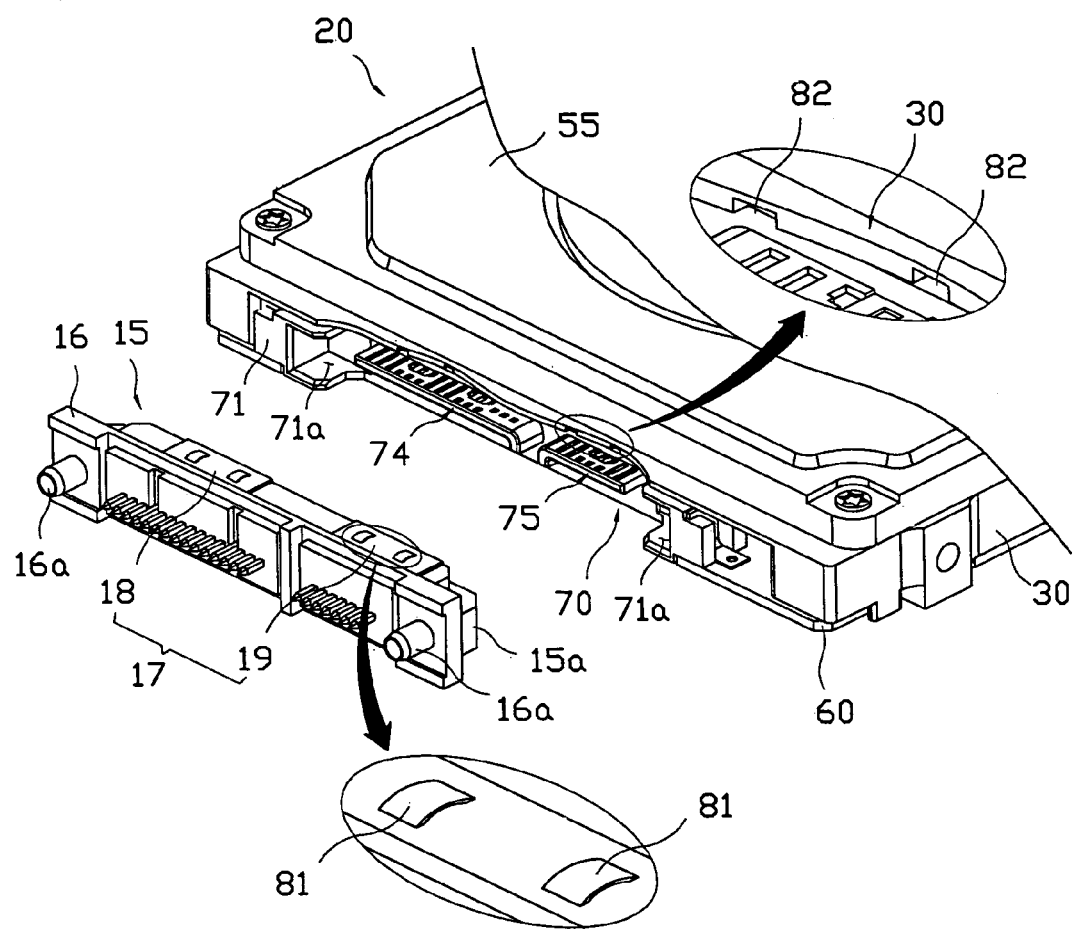
FIG. 6 shows partially cut-away magnified views that further illustrate the HDD and receptacle of FIG. 5.
Figure 7:
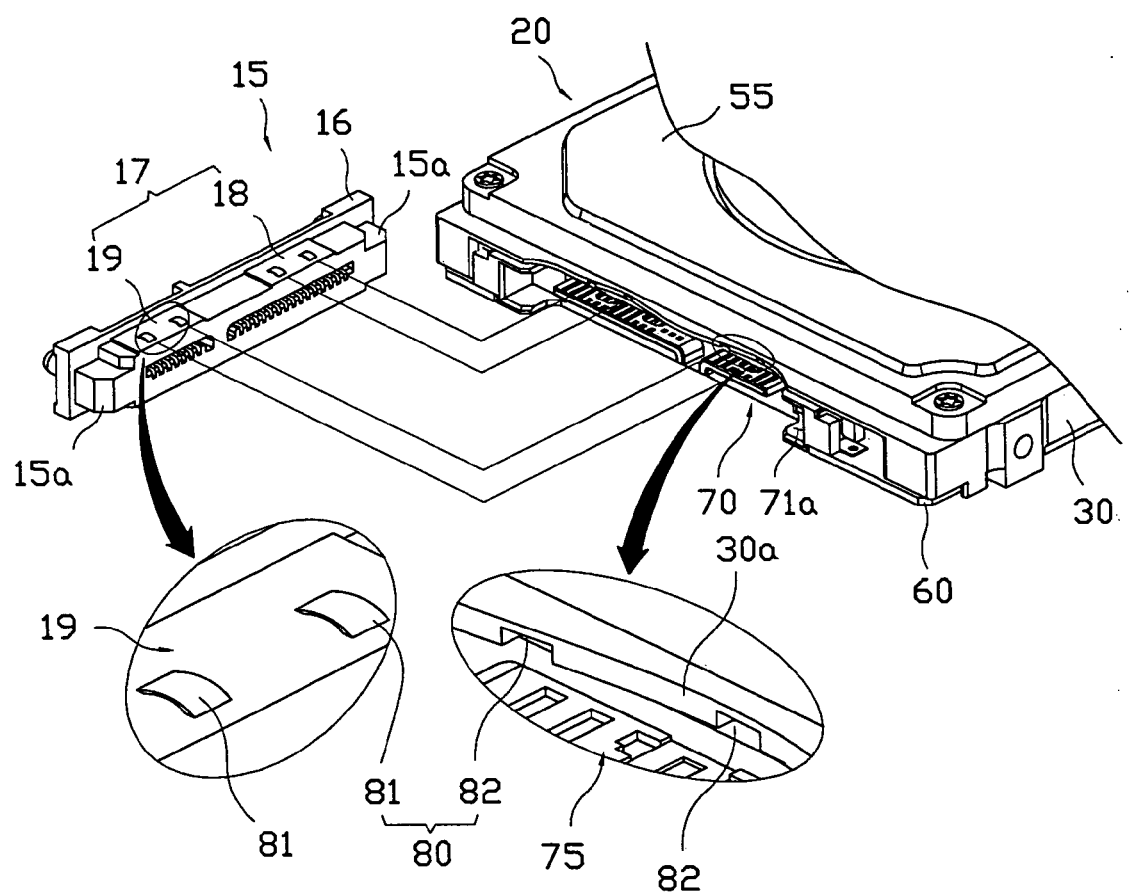
FIG. 7 is a perspective view of an HDD and corresponding receptacle according to another embodiment of the invention.
Figure 8:
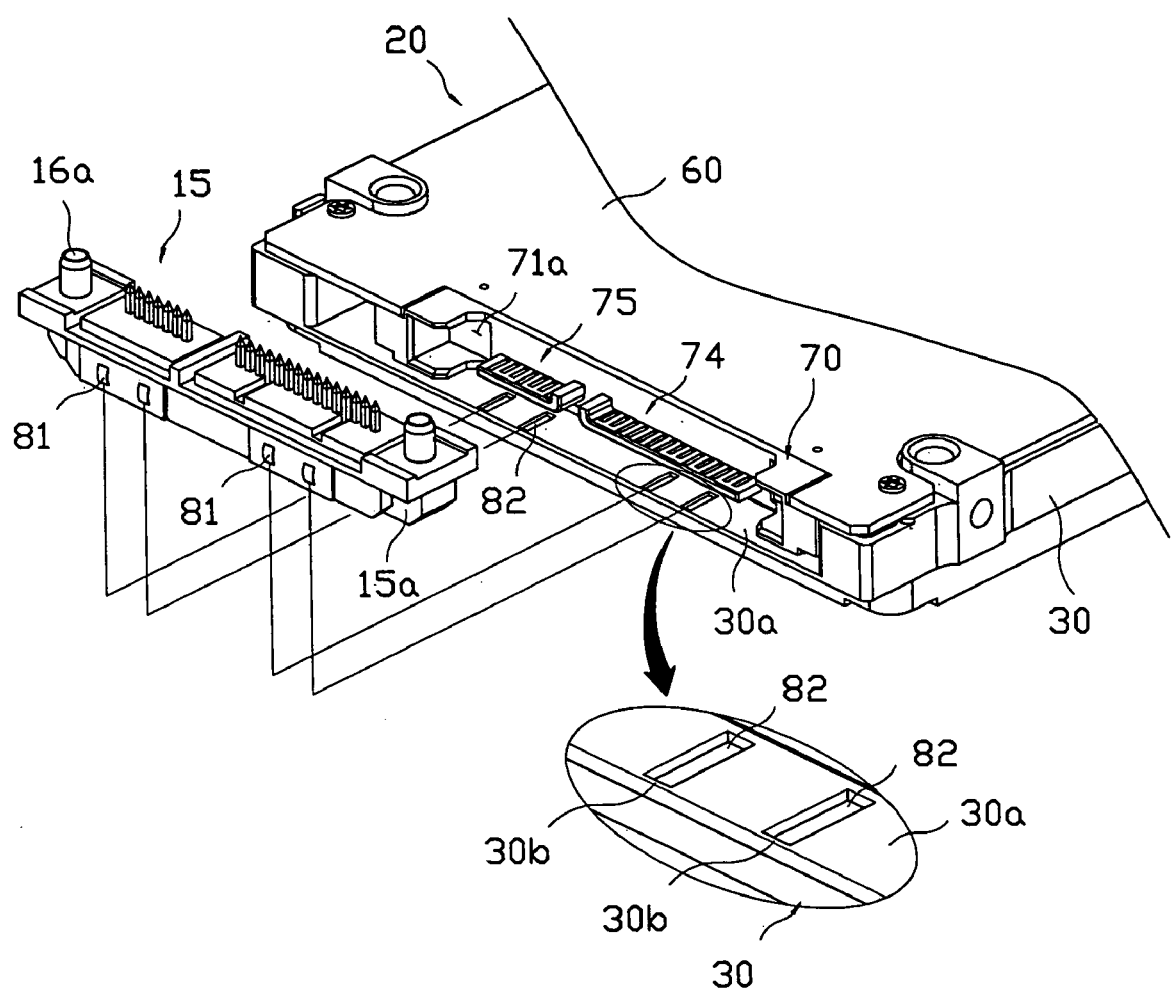
FIG. 8 is an alternate perspective view showing the arrangement of the HDD and receptacle of FIG. 5 from a bottom perspective.

FIG. 5 is a perspective view of a receptacle provided in a notebook computer in relation to HDD 20 of FIG. 3. FIG. 6 includes two related cut-away and magnified views further illustrating certain aspects of HDD 20 and a corresponding receptacle, as shown in FIG. 5. FIG. 7 is a perspective view of HDD 20 and a corresponding receptacle, as shown in FIG. 6, albeit arranged in a different direction. FIG. 8 is a view of an arrangement between HDD 20 and the receptacle of FIG. 5 from a bottom perspective. Referring collectively to FIGS. 4 through 8, PCBA 60 may be attached to the lower surface of base 30 using a plurality of bolts S2. In the illustrated example, PCBA 60 may include a printed circuit board (PCB) 61 on which a plurality of circuit components parts are mounted and a plug 70 coupled to one side of PCB 61.

A through hole 62 may be formed in a center region of PCB 61. A variety of circuit components, such as a controller 63 adapted to control various aspects and features of HDD 20 and memories 64a and 64b, may be accessed in proximity to hole 62.

Plug 70 is coupled to one side of PCB 61 and may include a body portion 71 comprising a hook accommodation portion 71a formed at either end of body portion 71, a power transfer pin portion 74 provided in body portion 71 and adapted to transfer power from a connected notebook computer, and a data transfer pin portion 75 provided adjacent to power transfer pin portion 74 and adapted to transfer data to/from the notebook computer to HDD 20.

In one embodiment, as illustrated in FIGS. 4-8, the shape of body portion 71 of plug 70 is substantially rectangular and characterized by an open upper surface. The size of power transfer pin portion 74 is relatively greater than that of data transfer pin portion 75.

Receptacle 15, as coupled to plug 70, includes a support plate 16 having a pair of boss portions 16a protruding to a rear side and a terminal portion 17 protruding from a front side of support plate 16 toward plug 70. A hook rib 15a may be formed at either end of terminal portion 17, which is adapted to be forcibly inserted into the hook accommodation portion 71a of body portion 71 of plug 70 and stably supported therein.

As shown in the illustrated examples, terminal portion 17 may include a power supply terminal portion 18 coupled to power transfer pin portion 74 of plug 70, and a data transfer terminal portion 19 coupled to data transfer pin portion 75. Both power supply terminal portion 18 and data transfer terminal portion 19 have an open front surface and a closed rear surface allowing pins to protrude. Thus, power supply terminal portion 18 and data transfer terminal portion 19 of receptacle 15 may be coupled to power transfer pin portion 74 and data transfer pin portion 75 of plug 70, respectively. Simultaneously, as hook rib 15a of receptacle 15 is accommodated in hook accommodation portion 71a of plug 70, receptacle 15 and plug 70 may be effectively coupled to each other.

However, as described above, it is not possible to increase a coupling strength between receptacle 15 and plug 70 with the coupling mechanism described above. Accordingly, it is necessary to enhance the coupling strength between receptacle 15 and plug 70 while not negatively impacting the minimum design thickness for HDD 20. To this end, one embodiment of the invention provides an approach to improving overall coupling strength by addressing a relationship between receptacle 15 and base 30, without necessarily altering the mechanical structure of plug 70. That is, a dummy coupling portion 80 is provided to increase the coupling strength between receptacle 15 and plug 70, and more particularly between receptacle 15 and base 30, and is used to supplement the "primary" coupling structure described above.

Although dummy coupling portion 80 may be sufficiently applied in a simple hook method only, in one embodiment of the invention, dummy coupling portion 80 supports elastic coupling between receptacle 15 and plug 70. Thus, even when an external force is applied to computer device 10, receptacle 15 and plug 70 are not so easily separated from each other and can maintain a stable connected state.

Dummy coupling portion 80, as illustrated in FIG. 7, comprises a plurality of latches 81 provided on receptacle 15 and a plurality of latch accommodation portions 82 provided on base 30 in which latches 81 are elastically accommodated. Latches 81 are provided on each of power supply terminal portion 18 and data transfer terminal portion 19. That is, latches 81 protrude upward to a predetermined height from the upper surfaces of power supply terminal portion 18 and data transfer terminal portion 19. In one more specific embodiment, latches 81 may be leaf spring type elements providing elastic coupling. Latch accommodation portions 82 may be formed on a lower surface 30a of base 30 adjacent to plug 70 so that latches 81 may be coupled thereto. That is, latch accommodation portions 82 may be provided in the form of grooves formed in the lower surface 30a of base 30 toward cover 55.

Referring to FIG. 8, a reinforced portion 30b may be located between the end portion of base 30 and latch accommodation portions 82. That is, in the illustrated embodiment, latch accommodation portions 82 are formed in an area located to the rear of reinforced portion 30b in an end portion of base 30.

When latch accommodation portions are provided in a plug formed from plastic, the thickness of the plug must be increased such that the latches are stabled accommodated. In addition, the depth of latch accommodation portions must be similarly increased to obtain a desired effect. However, when latch accommodation portions 82 are provided in base 30, which is formed from a relatively thin metal sheet as contemplated by certain embodiments of the invention, the mechanical stiffness of base 30 is nonetheless sufficiently strong such that latches 81 may be stably coupled to latch accommodation portions 82.

In one embodiment HDD 20 may be coupled to computer device 10 in an arrangement like the one shown in FIG. 3. Plug 70 of HDD 20 is thus coupled to receptacle 15. Then, power supply terminal portion 18 and data transfer terminal portion 19 of receptacle 15 are coupled respectively to power transfer pin portion 74 and data transfer pin portion 75 of plug 70. Simultaneously, hook rib 15a of receptacle 15 is accommodated in hook accommodation portion 71a of plug 70. As a result, a primary mechanical coupling between receptacle 15 and plug 70 is achieved.

At the same time, latches 81 of receptacle 15 are elastically accommodated in latch accommodation portions 82 formed on the lower surface 30a of base 30. That is, after latches 81 in the form of a leaf spring are pressed by reinforced portion 30b of base 30 and then released into latch accommodation portion 82, a second or supplement coupling is achieved. Thus, overall coupling strength between receptacle 15 and plug 70 markedly improved over conventional HDD designs.

Hence, even when a mechanical vibration or an external impact force is applied to computer device 10 and/or HDD 20 during assembly or shipping, receptacle 15 and plug 70 are not so easily separated from each other. Accordingly, the problems of diminished reliability and stability associated with conventional connections between a plug and receptacle are remedied. Further, embodiments of the invention accomplish this remedy via the provision of latch accommodation portions 82 in base 30. As a result, the minimum thickness of plug 70 is not adversely impacted and a more compact HDD design may be realized.

Figure 9:
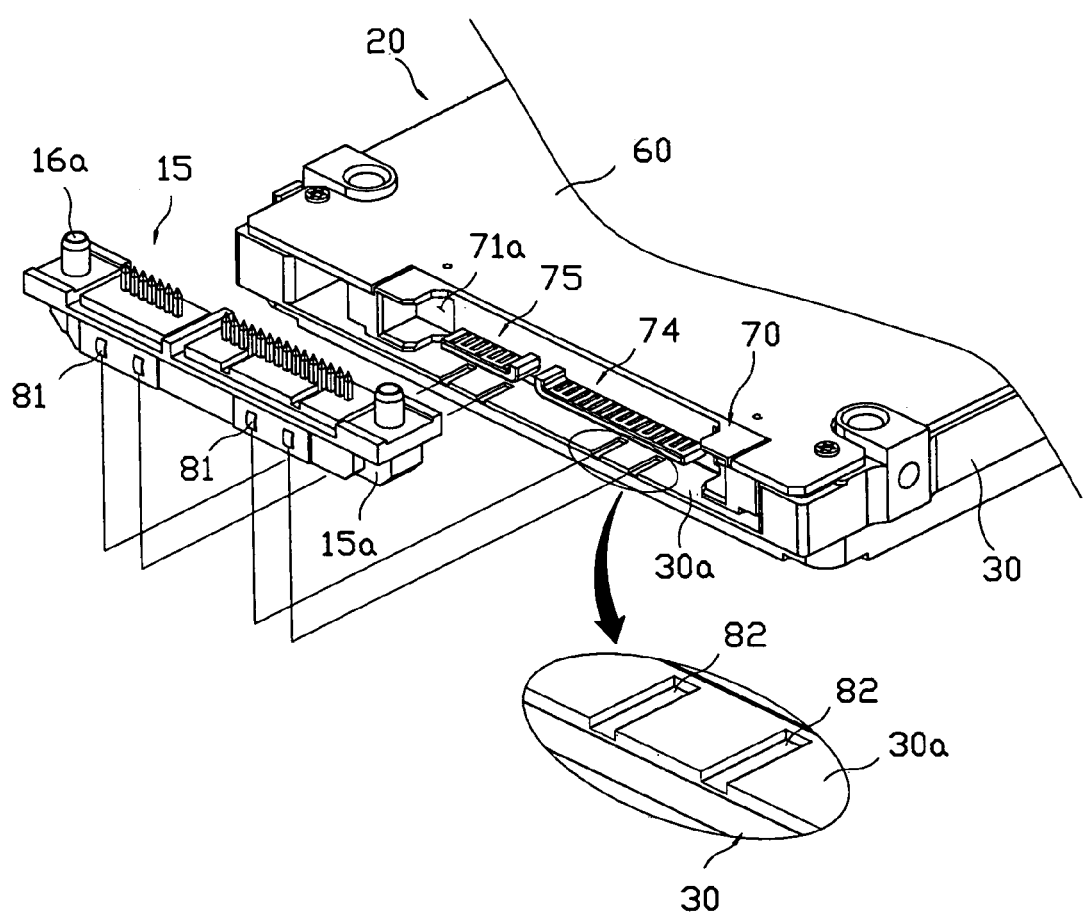
FIG. 9 is a perspective view showing yet another arrangement of a receptacle and plug in a computer according to another embodiment of the invention.

FIG. 9 is a perspective view showing an arrangement between a receptacle and a corresponding plug in accordance with another embodiment of the invention. In the foregoing embodiment, reinforced portion 30b is provided between an end portion of base 30 and latch accommodation portions 82.

However, as shown in FIG. 9, reinforced portion 30b may be otherwise provided. That is, latch accommodation portions 82 may be formed to continue a predetermined distance back into the end portion of base 30.

Figure 10:
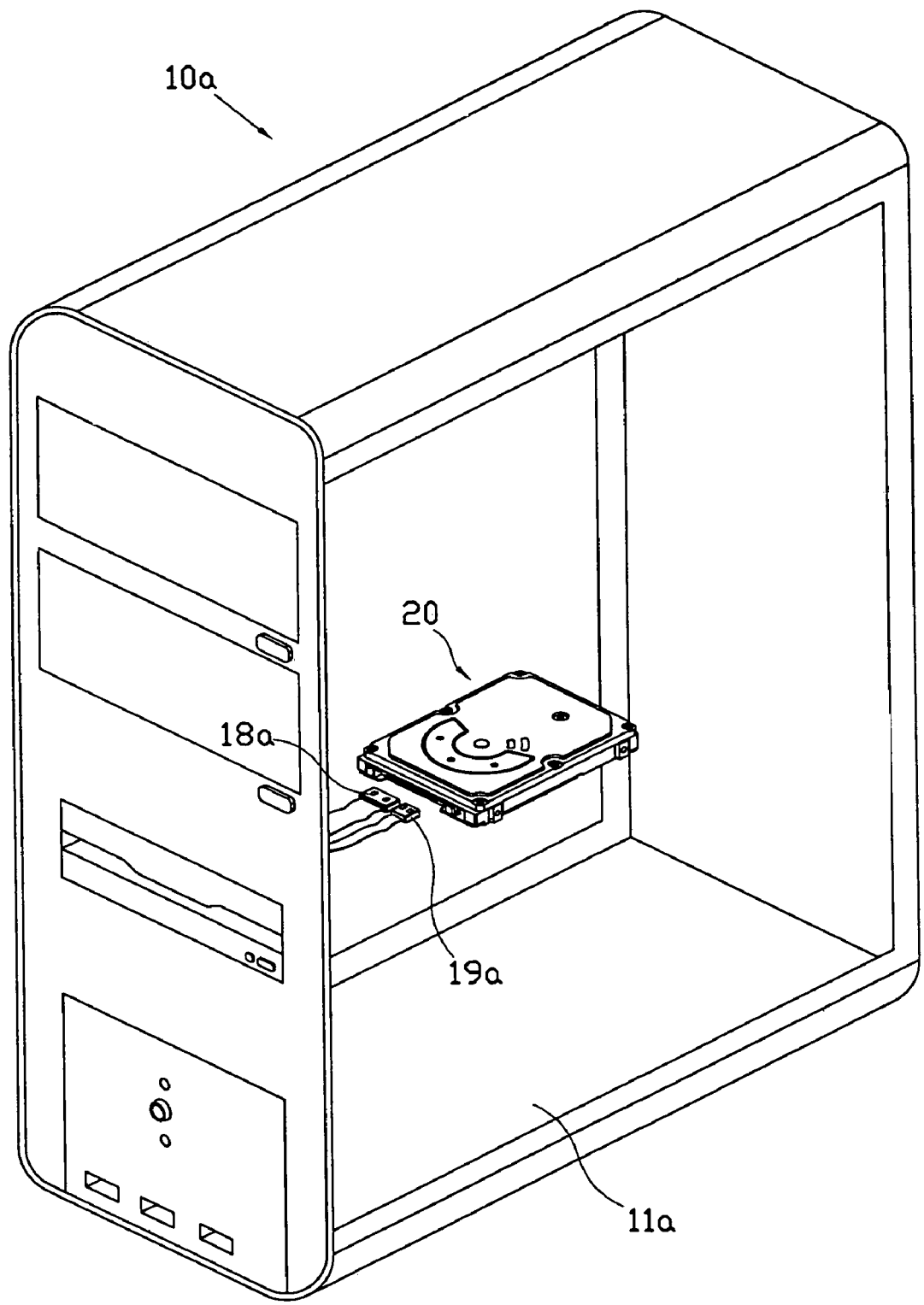
FIG. 10 is a perspective view of an HDD according to yet another embodiment of the invention, as coupled to a desktop computer.
Figure 11:
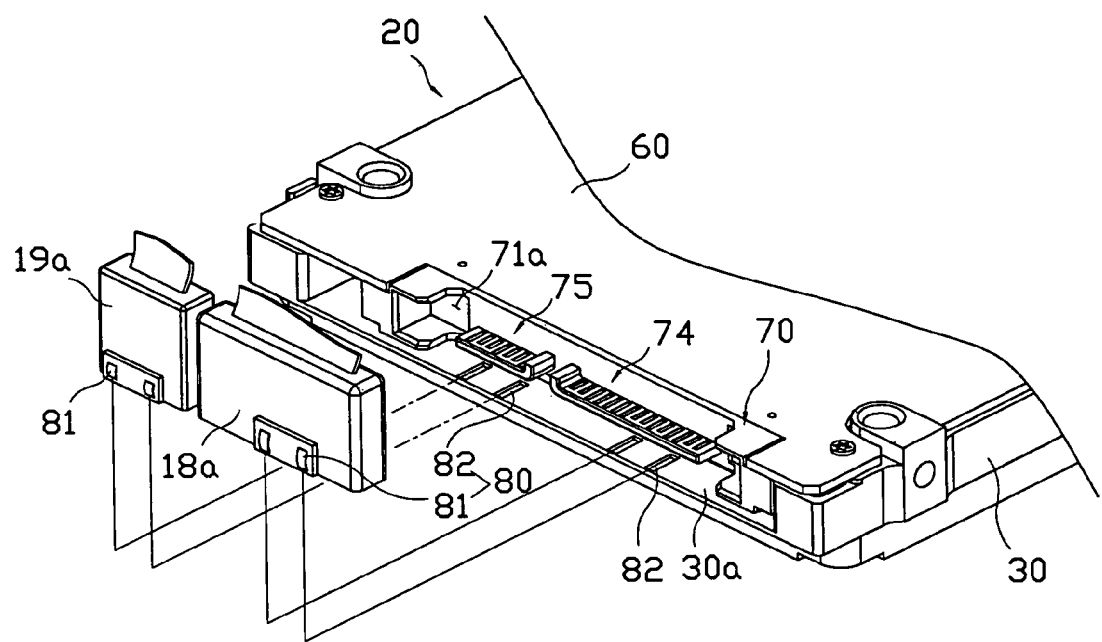
FIG. 11 is a perspective view showing further illustrating the HDD of FIG. 10.

FIG. 10 is a perspective view of an HDD according to yet another embodiment of the invention as coupled within a desktop computer FIG. 11 is a perspective including partially cut-away magnified views of the HDD shown in FIG. 10. Of note, the previously described embodiments were drawn to examples including a notebook computer. Embodiments of the invention may, however, be adapted to desktop computers.

As shown in FIG. 10, in the desktop computer, a power supply terminal portion 18a and a data transfer terminal portion 19a, which correspond to receptacle 15, are provided in a main body 11a. Unlike the notebook computer, in the desktop computer, power supply terminal portion 18a and data transfer terminal portion 19a are coupled to plug 70 of HDD 20 by being separated from each other.

Latches 81 and latch accommodation portions 82 related to dummy coupling portion 80 may be provided on an upper surface of power supply terminal portion 18a and data transfer terminal portion 19a and the lower surface 30a of base 30 of HDD 20, respectively. By this coupling between latches 81 and latch accommodation portions 82, an enhanced coupling strength may be achieved over that provided by a simple coupling between power supply terminal portion 18a and data transfer terminal portion 19a, and the plug 70. The structure and operation of the HDD coupling mechanism shown in FIG. 10 is otherwise similar to described above in the context of a notebook computer.

In the above-described embodiments, the notebook computer and the desktop computer are referred to as a "host device". However, any electronic products susceptible to the advantages of an HDD according to an embodiment of present invention may be designed in view of the foregoing and similarly serve as a host device.

Although several embodiments of the invention have been shown and described, the present invention is not limited to only the described embodiments. Instead, it will be appreciated by those skilled in the art that changes may be made to these embodiments without departing from the scope of the invention which is defined by following claims and their equivalents.

What is claimed is:

1. A hard disk drive (HDD) forming a connection with a receptacle of a host device, the HDD comprising:
   a printed circuit board assembly (PCBA) comprising a plug; and
   a base disposed on the PCBA, wherein the base comprises at least one latch accommodation portion disposed in a lower surface of the base, and wherein a spindle motor is installed on an upper surface of the base,
   wherein the receptacle comprises at least one latch, and
   wherein the at least one latch accommodation portion elastically accommodates the at least one latch.

2. The HDD of claim 1, wherein the at least one latch protrudes upward from an upper surface of the receptacle and the at least one latch accommodation portion is a groove formed in a portion of the lower surface of the base that is adjacent to the plug.

3. The HDD of claim 2, wherein the at least one latch is a leaf spring.

4. The HDD of claim 3, wherein the plug comprises a power transfer pin portion adapted to transfer power and a data transfer pin portion adapted to transfer data;
   the receptacle comprises a power supply terminal adapted to couple to the power transfer pin portion and a data transfer terminal adapted to couple to the data transfer pin portion; and
   the at least one latch comprises a plurality of latches provided on an upper surface of the power supply terminal and an upper surface of the data transfer terminal.

5. The HDD of claim 2, wherein a reinforced portion is provided between an end portion of the base and the at least one latch accommodation portion.

6. The HDD of claim 1, wherein the base is formed of a metal material.

7. The HDD of claim 1, wherein the host device comprises a notebook computer or a desktop computer.

8. The HDD of claim 3, wherein the at least one latch comprises a plurality of latches and the at least one latch accommodation portion comprises a plurality of corresponding grooves provided in the lower surface of the base.

9. The HDD of claim 8, further comprising a plurality of reinforced portions, wherein each reinforced portion is provided between an end portion of the base and one of the plurality of latch accommodation portions.

10. The HDD of claim 3, wherein the base is formed of a metal material.

11. A storage device forming a connection with a receptacle of a host device, the storage device comprising:
    a plug comprising two hook accommodation portions, an inner surface, and a first transfer pin portion extending from the inner surface; and
    a base, wherein at least a portion of a lower surface of the base is disposed directly over and substantially parallel with outer surfaces of the plug, wherein each of the outer surfaces is disposed above a respective one of the hook accommodation portions,
    wherein the base comprises at least one latch accommodation portion disposed in the lower surface of the base,
    wherein the receptacle comprises at least one latch, and
    wherein the at least one latch accommodation portion elastically accommodates the at least one latch.

12. The storage device of claim 11, wherein the at least one latch protrudes upward from an upper surface of the receptacle and the at least one latch accommodation portion is a groove formed in the at least a portion of the lower surface of the base, wherein the at least a portion of the lower surface of the base is adjacent to the plug.

13. The storage device of claim 12, wherein the at least one latch is a leaf spring.

14. The storage device of claim 13, wherein the plug further comprises a power transfer pin portion adapted to transfer power;
    the first pin portion is a data transfer pin portion adapted to transfer data;
    the receptacle comprises a power supply terminal adapted to couple to the power transfer pin portion and a data transfer terminal adapted to couple to the data transfer pin portion; and
    the at least one latch comprises a plurality of latches provided on an upper surface of the power supply terminal and an upper surface of the data transfer terminal.

15. The storage device of claim 12, wherein a reinforced portion is provided between an end portion of the base and the at least one latch accommodation portion.

16. The storage device of claim 11, wherein the base is formed of a metal material.

17. The storage device of claim 11, wherein the host device comprises a notebook computer or a desktop computer.

18. The storage device of claim 13, wherein the at least one latch comprises a plurality of latches and the at least one latch accommodation portion comprises a plurality of corresponding grooves provided in the lower surface of the base.

19. The storage device of claim 18, further comprising a plurality of reinforced portions, wherein each reinforced portion is provided between an end portion of the base and one of the plurality of latch accommodation portions.

20. The storage device of claim 13, wherein the base is formed of a metal material.

* * * * *